(No Model.) 2 Sheets—Sheet 1.
F. A. MAGOWAN.
FLEXIBLE TUBE FOR AIR BRAKES, &c.
No. 293,481. Patented Feb. 12, 1884.
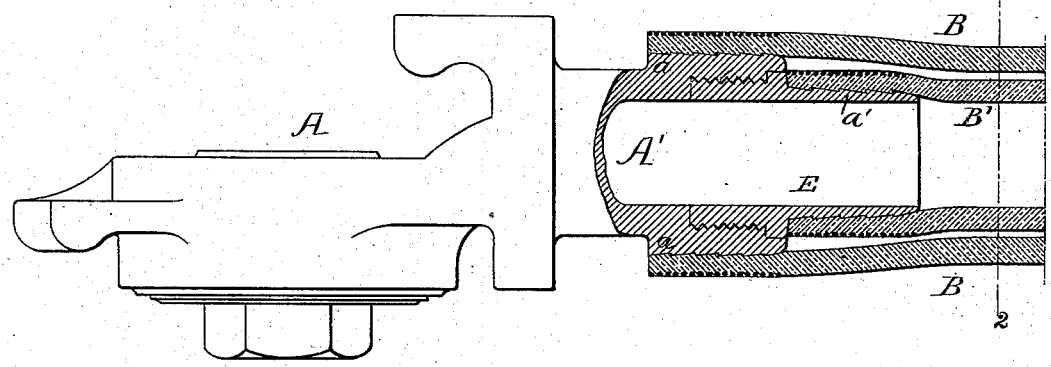
FIG. 1.
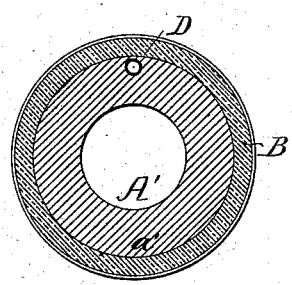
FIG. 3.
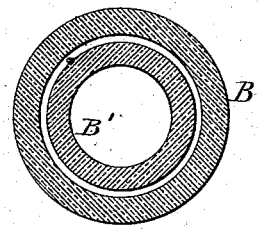
FIG. 2.
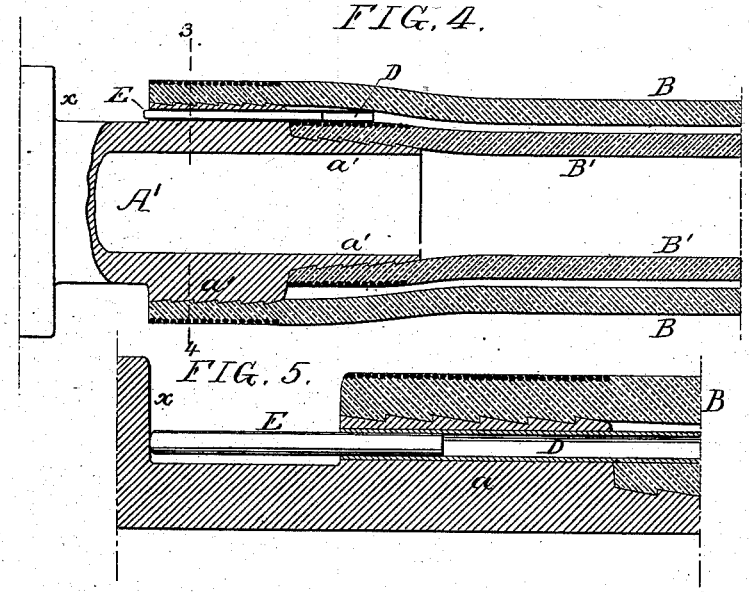
FIG. 4.
FIG. 5.
WITNESSES:
James F. Tobin
John M. Clayton.
INVENTOR:
Frank A. Magowan
by his Attorneys
Howson & Sons (No Model.)  2 Sheets—Sheet 2.

F. A. MAGOWAN.
FLEXIBLE TUBE FOR AIR BRAKES, &c.

No. 293,481.  Patented Feb. 12, 1884.

UNITED STATES PATENT OFFICE.

FRANK A. MAGOWAN, OF TRENTON, NEW JERSEY.

FLEXIBLE TUBE FOR AIR-BRAKES, &c.

SPECIFICATION forming part of Letters Patent No. 293,481, dated February 12, 1884.

Application filed November 22, 1883. (No model.)

*To all whom it may concern:*

Be it known that I, FRANK A. MAGOWAN, a citizen of the United States, residing in Trenton, Mercer county, New Jersey, have invented certain Improvements in Flexible Tubes for Air-Brakes, &c., of which the following is a specification.

My invention relates to the flexible tubes or rubber hose used in connection with Westinghouse air-brakes or other brakes, and to tubes or hose generally for conveying fluids; and my invention consists in the combination of an inner and an outer flexible tube or rubber hose with a coupling or other attachment adapted to be secured to both tubes or hose, the object of this feature of my invention being to lessen the liability to accidents and delays due to the bursting of the single tubes or hose heretofore used, more particularly in connection with air-brakes.

My invention further consists in combining the duplex tube and coupling or attachment with a signaling device or tell-tale for notifying the inspector of the air-brakes, or other apparatus to which my invention may be applied, when a leakage in the inner tube takes place.

Figure 6:
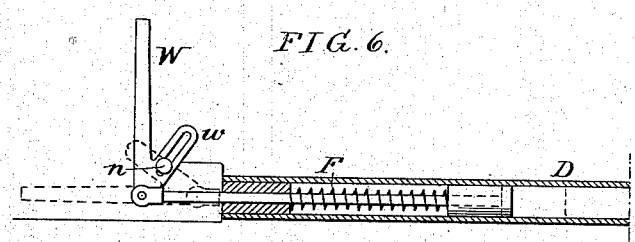

In the accompanying drawings I have shown my invention as applied to an air-brake, Figure 1 being a longitudinal section of the duplex flexible tube for air-brakes, with a portion of one of the couplings; Fig. 2, a transverse section on the line 1 2, Fig. 1; Fig. 3, a transverse section on the line 3 4, Fig. 4; Fig. 4, a view illustrating the combination of the duplex tube with a signaling device or telltale; Figs. 5 and 6, enlarged sectional views of signaling devices; and Fig. 7, a sectional view, illustrating a method of applying the coupling or attachment to the two tubes or hose.

The coupling or attachment A may be of any ordinary construction used in air-brakes, with this exception, that the tubular stem or tail-piece A' of the coupling in my invention is constructed for attachment to an outer flexible tube or hose, B, and an inner flexible tube or hose, B', the stem having an enlargement, *a*, to which the end of the outer tube is tightly fitted and secured by wire wrappings or otherwise, while the stem is reduced in diameter at *a'*, to receive the end of the inner tube, which is properly secured, as indicated in the drawings. The tubes or hose themselves may be made in the same manner and of the same materials as those in common use for air-brakes; but I prefer to make the inner hose non-expansible, so that as long as this inner hose is in service there will be no strain on the outer one, and the latter remains unimpaired. The relative diameters of the two flexible tubes should be such that the inner tube can be pulled freely through the outer tube; and I prefer to make the diameters such that there shall be an annular space between the two, although the interior of the outer tube may be so close to the exterior of the inner tube that the latter will be capable of resisting a greater internal pressure than it could in the absence of the outer tube. The outer tube, however, which I prefer to make thicker and stronger than the inner tube, is intended not so much as a backing for the latter as a provision against accidents to the inner tube, for should the latter leak there can be no cessation of the action of the air-brakes, for the outer tube, which then comes into service, is comparatively unimpaired, and forms a perfect substitute for the injured inner hose.

When the tube or rubber-hose of an air-brake bursts, the brakes must be operated by hand, or there must be a stoppage of the train of cars until the damaged tube or hose can be replaced by a new one; but I prefer to combine with the duplex tube a signaling device, which will serve to notify the attendants that the inner tube is leaking. The train, however, may pursue its course, the air-brakes being in a condition to perform their duties, owing to the outer tube, until the train reaches its destination or other point where the necessary repairs suggested by the signal can conveniently be made.

Different kinds of signals may be adopted. For instance, a small tube, D, may be driven into a hole in the coupling, as shown in Fig. 4, and more clearly in the enlarged view, Fig. 5, this tube communicating with the annular space between the two hose. A sliding rod, E, fits into the tube sufficiently tight to retain its place therein in the absence of any air under pressure in the space between the two hose; but should the inner tube leak, the rod will be pushed out against the shoulder $x$, and this will be a signal for the man whose duty it is to notify the proper authorities that repairs will be required when the train reaches any station or terminus, where it will be convenient to replace the damaged tube by a new one.

The signal may consist of a plate, W, painted some conspicuous color, so as to be readily seen by the inspector, this plate having an arm, $w$, Fig. 6, through an elongated slot in which passes a pin, $n$, into a projection on the coupling, the plate being hung to a rod, F, provided with a piston adapted to the tube D. A spiral spring surrounding the rod tends to force the piston inward, and to maintain the plate W in the position shown by dotted lines; but when, owing to the leakage of the inner tube, there is a pressure of air in the annular space between the two hose, the piston will be forced outward in the tube D, and the plate W will project outward, as shown by plain lines in Fig. 6, thereby notifying the proper authorities that there is a leakage in the inner hose.

Many other and different signaling devices will readily suggest themselves; hence, in this part of my invention, I do not restrict myself to the devices shown.

Figure 7:
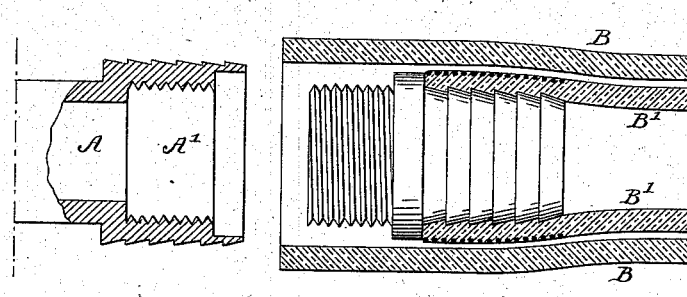

To facilitate the securing of the two hose to the attachment A, I prefer to make the latter in two parts, as shown in Figs. 1 and 7, the portion of the tail-piece or stem, to which the inner hose is secured, being adapted to be screwed into the outer portion. The inner hose is first secured to its portion of the stem, and is then drawn, with the latter, into the outer tube and screwed into the outer portion of the attachment or tail-piece, and the end of the outer hose is then wired or otherwise secured to the latter, as will be readily understood.

While my invention is especially applicable to air-brake couplings, it may be applied to various other apparatus in which rubber-hose or flexible tubing is used for the conveyance of fluids, and the attachment A′, instead of being in the form of a coupling, may be specially constructed simply to receive the ends of the two flexible tubes, and, if desired, a signaling device also.

I claim as my invention—

1. The combination of an inner and outer flexible tube for air-brakes or other purposes, with an attachment having a tubular stem or tail-piece, to which both tubes are secured, substantially as set forth.

2. The combination of an inner and outer tube for air-brakes or other purposes, and a stem or tail-piece, constructed for attachment to both tubes, with a signaling device actuated by air or other fluid under pressure, which may gain access to the annular space between the two tubes, substantially as specified.

In testimony whereof I have signed my name to this specification in the presence of two subscribing witnesses.

F. A. MAGOWAN.

Witnesses:
HARRY SMITH,
HUBERT HOWSON.